(12) United States Patent
Spielman et al.

(10) Patent No.: US 7,371,323 B1
(45) Date of Patent: May 13, 2008

(54) SYSTEM AND METHOD FOR REDUCING WASTEWATER CONTAMINANTS

(76) Inventors: Rick B. Spielman, 11030 Cochita SE., Albuquerque, NM (US) 87123; Link Summers, P.O. Drawer P, Taos, NM (US) 87571

( * ) Notice: Subject to any disclaimer, the term of this patent is extended or adjusted under 35 U.S.C. 154(b) by 243 days.

(21) Appl. No.: 11/202,511

(22) Filed: Aug. 11, 2005

Related U.S. Application Data (60) Provisional application No. 60/600,530, filed on Aug. 11, 2004.

(51) Int. Cl.
*C02F 3/00* (2006.01)
(52) U.S. Cl. .................. 210/605; 210/615; 210/620; 210/630; 210/748; 210/263; 210/265; 210/532.2
(58) Field of Classification Search .............. 210/605, 210/615–617, 620–623, 630, 748, 263, 265, 210/532.2
See application file for complete search history.

(56) References Cited

U.S. PATENT DOCUMENTS

| | | | |
|---|---|---|---|
| 3,971,947 A | 7/1976 | Lambert et al. | |
| 3,992,295 A | 11/1976 | Box, Jr. et al. | |
| 4,007,120 A | 2/1977 | Bowen | |
| 4,017,734 A | 4/1977 | Ross | |
| 4,053,399 A | 10/1977 | Donnelly et al. | |
| 4,101,777 A | 7/1978 | Reid | |
| 4,141,686 A | 2/1979 | Lewis | |
| 4,141,829 A | 2/1979 | Thiel et al. | |
| 4,176,061 A | 11/1979 | Stopka | |
| 4,255,257 A | 3/1981 | Greiner et al. | |
| 4,255,663 A | 3/1981 | Lewis | |
| 4,372,860 A | 2/1983 | Kaas | |
| 4,400,270 A | 8/1983 | Hillman | |
| 4,465,594 A * | 8/1984 | Laak | 210/151 |
| 4,572,821 A | 2/1986 | Brodard et al. | |
| 4,604,215 A | 8/1986 | McCorquodale | |
| 4,699,720 A | 10/1987 | Harada et al. | |
| 4,766,321 A | 8/1988 | Lew et al. | |
| 4,793,919 A | 12/1988 | McCorquodale | |
| 4,892,712 A | 1/1990 | Robertson et al. | |
| 4,959,142 A | 9/1990 | Dempo | |
| 5,053,142 A | 10/1991 | Sorensen et al. | |
| 5,057,220 A | 10/1991 | Harada et al. | |
| 5,120,450 A | 6/1992 | Stanley, Jr. | |

(Continued)

OTHER PUBLICATIONS

Brandes, Marek, "Characteristics of effluents from gray and black water septic tanks", *Journal WPCF*, (Nov. 1, 1978),2547-2559.

*Primary Examiner*—Chester T. Barry
(74) *Attorney, Agent, or Firm*—James Creighton Wray; Clifford D. Hyra (57) ABSTRACT

A wastewater treatment system. Toilet, kitchen, commercial, and industrial process waste is segregated from the total wastewater stream and treated in order to reduce the total nitrogen, phosphorous, pathogens, household hazardous and hazardous wastes and organic carbon released into the environment. Release of treated toilet, kitchen, commercial, and industrial process liquid waste is eliminated. Segregation of toilet, kitchen, and commercial and industrial process wastewater from non-toilet, kitchen, commercial and industrial process wastewater requires separate sewer plumbing and separate storage of the toilet, kitchen, commercial and industrial process wastewater. The non-toilet, non-kitchen, non-commercial & non-industrial process wastewater can be released via a traditional septic tank and drain field or processed for reuse.

38 Claims, 4 Drawing Sheets

U.S. PATENT DOCUMENTS

| | | |
|---|---|---|
| 5,130,032 A | 7/1992 | Sartori |
| 5,145,587 A | 9/1992 | Ishii et al. |
| 5,158,689 A | 10/1992 | Ishii et al. |
| 5,207,993 A | 5/1993 | Burris |
| 5,370,801 A | 12/1994 | Sorensen et al. |
| 5,614,087 A | 3/1997 | Le |
| 5,807,484 A | 9/1998 | Couture et al. |
| 5,868,945 A | 2/1999 | Morrow et al. |
| 6,006,387 A | 12/1999 | Cooper et al. |
| 6,115,862 A | 9/2000 | Cooper et al. |
| 6,221,259 B1 | 4/2001 | Kittrell |
| 6,243,887 B1 * | 6/2001 | Palffy et al. ............... 4/431 |

* cited by examiner

SYSTEM AND METHOD FOR REDUCING WASTEWATER CONTAMINANTS

BACKGROUND OF THE INVENTION

1. Field of the Invention (Technical Field)

The present invention relates generally to the field of wastewater treatment and, more specifically, to the reduction in the level of nitrogen- and phosphorous-containing compounds and organic compounds in wastewater released into the environment.

2. Background Art

Toilet and kitchen waste is the primary source of nitrogen, phosphorous, and the bulk of solids in most domestic wastewater discharges. These toilet and kitchen waste discharges can be segregated from the wastewater discharged from other plumbing fixtures (e.g., powder room wash basin) using separate sewer plumbing, and captured in a separate non-discharging tank for storage, treatment, and disposal as a method for nitrogen, phosphorous and/or solids reduction. Cluster systems and large community systems can use centralized, segregated treatment and disposal systems for toilet and kitchen waste with non-toilet waste remaining on the individual lot or on separate plots for treatment and disposal.

Wastewater containing nitrogen compounds and phosphorous compounds such as ammonia, organic nitrogen, nitrates, nitrites, and phosphates that contaminate ground and surface water resources is a major concern in a world facing potable water shortages. Traditional onsite wastewater systems including septic systems do little or nothing to reduce the level of nitrogen and phosphorous compounds in the released wastewater. No low-cost technology is available to remove nitrates ($NO_3$), nitrites ($NO_2$), and phosphates ($PO_4$) from wastewater. Release of these compounds to environmental surface water, or especially ground water, is to be avoided.

Background art in the field of wastewater treatment is limited to treating the entire volume of wastewater with traditional bacterial digestion, oxidation, settling, and disinfection (usually using chlorination). More advanced methods, such as ozone and ultraviolet radiation, also are used to treat water and wastewater. There does not appear to be any prior art in which segregation, separate handling, solids reduction, and treatment of wastewater containing high levels of nitrogen waste leading to a zero-effluent system is applied other than having toilet waste segregated and held in a holding tank which is pumped periodically or used in composting systems.

Ultraviolet (UV) radiation can be used as the sole agent to sterilize liquids. Several disclosures relate to the development of devices and configurations for using UV to sterilized liquids. For example, U.S. Pat. No. 3,971,947 issued to Lambert, et al. and entitled "Ultraviolet water purifier", describes a method and apparatus for the generic use of UV radiation to sterilize water. U.S. Pat. No. 4,017,734 issued to Ross, and entitled "Water purification system utilizing ultraviolet radiation", describes the use of linear configurations using UV radiation to sterilize water. U.S. Pat. No. 4,101,777 issued to Reid, and entitled "Fluid purification device and ultraviolet lamp therefor", describes the use of yet another configuration to use UV radiation to sterilize water. U.S. Pat. No. 4,141,686 issued to Lewis, and entitled "Disposable liquid sterilizer unit", describes the use of disposable devices that use UV radiation to sterilize water. U.S. Pat. No. 4,255,663 issued to Lewis, and entitled "Disposable liquid sterilizer unit", describes the use of still another disposable configuration that uses UV radiation to sterilize water. U.S. Pat. No. 4,372,860 issued to Kass, entitled "Method and an apparatus for cleaning water in a swimming pool", describes the use of specific configurations for UV radiation sterilization of swimming pool water. U.S. Pat. No. 4,400,270 to Hillman, entitled "Ultraviolet apparatus for disinfection and sterilization of fluids", describes sterilization of water by UV radiation. U.S. Pat. No. 4,766,321 issued to Lew, et al. and entitled "Symbiotic filter-sterilizer", describes the use of configurations that use UV radiation to clean filters.

Further, U.S. Pat. No. 4,892,712 issued to Robertson, et al. and entitled "Fluid purification", describes the use of specific configurations requiring various catalysts and UV radiation to sterilize and clean water. U.S. Pat. No. 4,959,142 issued to Dempo, and entitled "Water treating apparatus", describes the use of specific configurations that use UV radiation to sterilize constantly flowing water. U.S. Pat. No. 5,120,450 issued to Stanley, and entitled "Ultraviolet radiation/oxidant fluid decontamination apparatus", describes the use of a non-stick coating on the outside of lamp sleeves in configurations that use UV radiation to sterilize water. U.S. Pat. No. 6,221,259 issued to Kittrekk, and entitled "Process and catalyst for photocatalytic conversion of contaminants", describes the use of specific catalysts in certain configurations that use UV radiation to sterilize and clean water. The disclosures of each these references are herein incorporated by reference.

Additionally, it is known to use of ozone alone to sterilize water and/or treat the organic content water. For example, U.S. Pat. No. 4,007,120 issued to Bowen, and entitled "Oxidation and ozonation chamber", describes the use of ozone to treat and disinfect water. U.S. Pat. No. 4,053,399 issued to Donnelly, et al. and entitled "Method and system for waste treatment", describes the use of ozone to oxidize and disinfect wastewater. U.S. Pat. No. 4,176,061 issued to Stopka, and entitled "Apparatus and method for treatment of fluid with ozone", describes the use of ozone in the form of micro-bubbles to oxidize and to disinfect wastewater. U.S. Pat. No. 4,255,257 issued to Greiner, et al. and entitled "Process for the treatment of water", describes the use of pressurized ozone to treat water. U.S. Pat. No. 4,545,716 issued to Boeve, and entitled "Method of producing ultrapure, pyrogen-free water", describes the use of highly-concentrated, substantially-pure ozone to treat deionized water. U.S. Pat. No. 4,572,821 issued to Brodard, et al. and entitled "Apparatus for dissolving ozone in a fluid", describes the use of pressurized ozone to treat water. U.S. Pat. No. 5,130,032 issued to Sartori, and entitled "Method for treating a liquid medium", describes the use of ultrasound to disperse ozone in water and the use of ultrasound to aid in the cleanup of ozonated water. U.S. Pat. No. 5,207,993 issued to Burris, and entitled "Batch liquid purifier", describes the use of ozone in water with recirculation of the water through the ozone injection region to purify water. U.S. Pat. No. 5,868,945 issued to Morrow, et al. and entitled "Process of treating produced water with ozone", describes the use of ozone to treat water, containing hydrocarbons, at elevated temperatures. U.S. Pat. No. 6,006,387 issued to Cooper, et al. and entitled "Cold water ozone disinfection", describes the use of ozone dissolved in water to disinfect mechanical assemblies. U.S. Pat. No. 6,115,862 issued to Cooper, et al. and entitled "Cold water ozone disinfection", describes the use of ozone dissolved in water to disinfect mechanical assemblies. The disclosures of each these references are herein incorporated by reference to the extent that they are not inconsistent with this application.

There also are disclosures relating to the use of oxidation, singly, to treat wastewater or water. For example, U.S. Pat. No. 3,992,295 issued to Box Jr., et al. and entitled "Polluted water purification", describes a process of catalyzed oxidation. U.S. Pat. No. 4,141,829 issued to Thiel, et al. and entitled "Process for wet oxidation of organic substances", describes a process of oxidation occurring at elevated temperatures. U.S. Pat. No. 4,604,215 issued to McCorquodale, and entitled "Wet oxidation", describes a process of oxidation occurring at elevated temperatures. U.S. Pat. No. 4,699,720 issued to Harada, et al. and entitled "Process for treating waste water by wet oxidations", describes a process of oxidation using catalysts. U.S. Pat. No. 4,793,919 issued to McCorquodale, and entitled "Wet oxidation system", describes a process of oxidation occurring with mixing or stirring of the fluid. U.S. Pat. No. 5,053,142 issued to Sorensen, et al. and entitled "Method for treating polluted material", describes a process of oxidation occurring in a fluid. U.S. Pat. No. 5,057,220 issued to Harada, et al. and entitled "Process for treating waste water", describes a process of oxidation using catalysts. U.S. Pat. No. 5,145,587 issued to Ishii, et al. and entitled "Method for treatment of waste water", describes a process of oxidation at elevated temperatures. U.S. Pat. No. 5,158,689 issued to Ishii, et al. and entitled "Method for purification of waste water", describes a process of oxidation at elevated temperatures.

Additionally, U.S. Pat. No. 5,370,801 issued to Sorensen, et al. and entitled "Method for treating polluted material", describes a process of oxidation occurring in a fluid. U.S. Pat. No. 5,614,087 issued to Le, and entitled "Wet oxidation system", describes a process of oxidation occurring in a stirred or mixed fluid. U.S. Pat. No. 5,807,484 issued to Couture, et al. and entitled "Waste water treatment", describes a process of oxidation using trickle filters. U.S. Pat. No. 5,888,389 issued to Griffith, et al. and entitled "Apparatus for oxidizing undigested wastewater sludges", describes a process of supercritical oxidation occurring in a fluid at elevated temperatures and pressures.

A further reference useful as background to the present invention is Brandes, M. "Characteristics of Effluents from Separate Septic Tanks Treating Grey and Black Waters From the Same House", J. Water Pollut. Control Fed., 50 pp. 2547-2559, 1978.

SUMMARY OF THE INVENTION
(DISCLOSURE OF THE INVENTION)

We describe a simple system that reduces the total amount of nitrogen and phosphorous compounds released into the environment by segregating the high-nitrogen and high-phosphorous waste from the majority of the wastewater generated followed by treatment (necessary for solids reduction) and evaporation of the remaining water. The invention finds practical utility anywhere, but especially in those areas where domestic waste-water is treated on-site (as distinguished from being disposed into a municipal sewer and waste-water treatment system. Toilet and kitchen waste is the primary source of nitrogen, and the bulk of solids, in most domestic wastewater discharges. These toilet and kitchen waste discharges (and possibly dishwasher discharges) can be segregated from the wastewater discharged from other plumbing fixtures using separate sewer plumbing and captured in a separate non-discharging tank for storage and treatment as a method for nitrogen, phosphorus, and/or solids reduction. The storage or holding tank can be any size and can be constructed of any suitable material.

The stored toilet waste can be treated by numerous physical, chemical, or biological means such as: aerobic digestion, anaerobic digestion, advanced oxidation, chemical action, filtration, solids separation, and disposed of by non-discharging methods such as evaporation or evapo-transpiration. The level of nitrogen and phosphorous removal in the overall total waste stream can be 90% to 98% or higher using this process. Similar reductions in solids can be expected.

A system is disclosed that uses segregation of waste streams, isolation of solids, nitrogen and phosphorous compounds, and treatment to reduce the impact of these wastewater contaminants on the environment. We describe a wastewater treatment system that segregates toilet and kitchen waste discharges from the wastewater discharged from other plumbing fixtures (gray water or, equivalently, non-toilet and non-kitchen wastewater) using totally separate sewer-plumbing systems.

Toilet and kitchen waste is captured in a separate non-discharging tank for storage and treatment as a method for nitrogen, phosphorous, and/or solids reduction. United States Environmental Protection Agency (EPA) data show that human waste accounts for >80% of the nitrogen in the waste stream from a typical home. The ability to segregate and treat toilet and kitchen waste is central aspect of this invention. The storage or holding tank for the toilet and kitchen waste can be any reasonable size and may be constructed of any suitable material. The stored toilet and kitchen waste is treated first by settling and solids separation, then by aerobic digestion and anaerobic digestion, followed by further settling, solids separation, and, optionally, filtration. In a complementary embodiment, the stored toilet waste is homogenized using an ultrasonic or other homogenizing device in order to accelerate the process of microbial digestion. Following biological treatment, the liquid toilet and kitchen waste is treated by advanced oxidation or wet-combustion, electrolytic incineration, or thermal destruction to remove organic carbon. The remaining water, containing high levels of dissolved solids, is then moved to an evaporation or evapo-transpiration stage.

A primary result of this invention is that the liquid toilet and kitchen waste is never released into the soil or water systems of the surrounding environment. Any remaining solid waste is treated via advanced oxidation, wet-combustion, ultrasonic decomposition, electrolytic incineration, or thermal destruction. Gray water or non-toilet non-kitchen wastewater is transported to a standard septic tank where it can be processed to reduce the already low levels of organic carbon and to sterilize the liquid. The invention has appeal, for example, in rural areas where septic tanks and fields are used in lieu of attachment to a municipal wastewater treatment system—although the invention may be used in non-rural areas as well.

The present invention may use advanced ultraviolet oxidation techniques that combine intense ultraviolet radiation (for example, 185-nm, 194-nm, and/or 254-nm wavelengths), ozone, and ultrasound to treat the gray water. The treated and disinfected gray water may then pass through an electrolytic cell to reduce the level of nitrogen and phosphorous in the gray water. The fully treated gray water is then available for reuse or disposal.

Approximately 90% to 98%, or more, of nitrogen and phosphorous is removed from the overall waste stream using the inventive process. Similar reductions in solids can be expected.

The configuration described has a number of advantages. The separation of toilet and kitchen waste from the remaining wastewater allows the gray water to be treated more easily. In particular, the lowered levels of nitrogen- and phosphorous-containing compounds minimize the impact of the treated gray water on the environment. In terms of volume, gray water accounts for 80-90% of the total water volume generated by a typical family home (but contributes comparatively minor quantities of nitrogen and phosphorus). The total segregation of the highly contaminated toilet and kitchen wastes from the waste stream that reaches the environment also greatly reduces the potential of harmful microbial organisms reaching the environment.

It is therefore an object of the invention to provide a system and an apparatus for the treatment of sewage and non-discharging disposal of the remaining water that greatly reduces the level of nitrates, nitrites, other nitrogen-containing compounds, phosphorus, and phosphorus-containing compounds reaching the environment.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings: Like elements are referenced with like numerals.

DESCRIPTION OF THE PREFERRED EMBODIMENTS (BEST MODES FOR CARRYING OUT THE INVENTION)

We describe a simple system to segregate toilet and kitchen waste discharges from the "gray water" wastewater discharged from other plumbing fixtures (non-toilet, non-kitchen wastewater) using totally separate sewer-plumbing systems. A basic aspect of this invention is to separate high nitrogen and phosphorous wastes from the majority of a domestic or other waste stream. Following separation, the non-toilet non-kitchen waste stream is treated as described below for release to the environment. No liquid toilet or kitchen waste need be discharged into the ground, aquifers, or local bodies of surface water. Toilet and kitchen waste is captured in a separate non-discharging tank for storage and treatment as a method for nitrogen, phosphorous, pathogen, and/or solids reduction. Solids present in a toilet and kitchen waste stream include contaminants are solids including fats, oils, and grease. Further, the overall waste stream may include pathogenic contaminants, as well as household hazardous wastes and other hazardous wastes such as solvents, pesticides, herbicides, masking agents, disinfectants, and cleaning agents.

The storage or holding tank can be any reasonable size, for example, but not limited to, 1000 gallons, and can be constructed of any suitable material such as, but not limited to, polyethylene, fiberglass, or concrete. The size of the holding tank is best determined by the size of the waste source; for ordinary single-family homes, the volume is typically 1000 gallons. Without excluding other configurations, we describe one configuration consisting of a tank composed of multiple compartments. The various waste treatment operations required to process the toilet and kitchen waste are conducted in separate compartments of the storage tank. The stored toilet and kitchen waste is be treated first by sedimentation and flotation of solids and aerobic digestion and anaerobic digestion (primarily in the first compartment), followed by further settling and solids separation, leading to mostly liquid toilet and kitchen waste in the second compartment. In an alternative embodiment, the stored toilet and kitchen waste is first homogenized using an ultrasonic or other homogenizing device in the first compartment.

After treatment in the first compartment, the liquid toilet and kitchen waste is treated by advanced oxidation or wet-combustion incineration to remove remaining organic carbon in the form of dissolved and suspended solids and sludge. Finally, the treated liquid toilet and kitchen waste is moved to an evaporation or evapo-transpiration disposal stage. An optional filter to clarify the liquid water may be employed prior to the evaporation stage. Notably, the liquid toilet and kitchen waste is never released into the soil or water systems of the surrounding environment. Any remaining solid waste is removed by pumping or treated via composting, electrolytic wet combustion, or thermal destruction.

The toilet and kitchen waste ("black water") treatment portion of the invention contains several important features. First, the presence of an advanced oxidation system is an important part of total organic carbon solids reduction. We describe herein an advanced oxidation system in which ozone is added to the liquid waste. The concentration of ozone in the liquid is suggested to be, but is not limited to, a level close to saturation for ozone in water at the temperature of the waste. Lower levels of ozone are possible, but reduce the treatment rate. The ozone also serves a secondary purpose of removing odors from the toilet waste storage tank. An ultrasonic mixer, mechanical mixer, ozone saturator, or other homogenizing device maximizes the absorption of ozone in the liquid. A number of ultraviolet (UV) lamps typically, but not limited to, 1 to 10 lamps, immediately follow the ozonation stage. The total number of UV lamps is determined by the size or waste volume of the system according to principles known in the art. These UV lamps typically emit radiation at a wavelength of 254 nm, but significant advantages can be achieved by using lamps that emit significant portions of their ultraviolet output at 185 nm and 194 nm, and other wavelengths shorter than 254 nm. These ultraviolet lamps are typically, but not limited to, about 36 inches to about 60 inches in length, and have an electrical power consumption of, but not limited to, about 40 W to about 200 W.

The ultraviolet light dissociates the ozone in the water, generating atomic oxygen and hydroxyl radicals. The oxygen and hydroxyl radicals cause a relatively rapid acceleration of the chemical oxidation processes in which the ozone combines with carbon-containing compounds in the liquid toilet and kitchen waste, generating a gaseous byproduct such as carbon dioxide. The liquid toilet and kitchen waste is continuously treated in the advanced oxidation system. The advanced oxidation system has a size such that the vast majority of suspended and dissolved solids in the liquid toilet and kitchen waste are destroyed.

Gray water or non-toilet non-kitchen wastewater is transported to a standard septic tank where it can be directly discharged into a conventional disposal system or processed with a secondary, tertiary, and/or disinfection system or with advanced ultraviolet oxidation techniques to reduce the already low levels of organic carbon and to disinfect the liquid. The treated effluent then passes through an electrolytic cell to reduce the level of nitrogen and phosphorous in the effluent. The fully treated effluent is then available for reuse or disposal.

The nitrogen and phosphorous removal from in the waste stream can reach approximately 90% to 98%, or higher, using the inventive method. Similar reductions in solids and pathogens can be expected.

One embodiment of the system would have a toilet and kitchen waste storage tank composed of three individual compartments in fluid communication. The total size of the storage is, for example, 1000 gallons with compartment volumes of, for example, 400 gallons, 400 gallons, and 200 gallons, respectively. Other compartment configurations and volumes are possible depending on the volume and concentration of the waste. The first compartment of the toilet waste storage tanks acts in a traditional fashion to separate gross solids in the toilet and kitchen waste from the liquid toilet and kitchen waste stream. In addition, anaerobic bacterial digestion takes place therein, which, over time, reduces the total solids level in the toilet and kitchen waste. The liquid toilet and kitchen waste separated from the total volume of toilet and kitchen waste flows into the second compartment of the toilet and kitchen waste storage tank.

In the second compartment, an advanced oxidation system is then used to treat the liquid toilet and kitchen waste in order to reduce or eliminate the remaining dissolved and suspended solids (total organic solids), reduce the biological oxygen demand (BOD), and raise the oxygen reduction potential (ORP). The advanced oxidation system is composed of several key components: (a) a water, air, or sonic pump is used to circulate the liquid toilet and kitchen waste through the system, (b) a gas injection device such as a venturi injector or a ultrasonic nozzle is used to inject ozone into the liquid waste stream, (c) an ozone generator such as, but not limited to, an electrical discharge ozone generator is the source of ozone, and (d) a number of ultraviolet lamps that create a region that is illuminated by intense levels of UV radiation. Liquid waste is typically, but not required to be, continuously circulated through this advanced oxidation system. Advanced treatment means also optionally my include a chemical precipitation unit, an aerobic system, a sequencing batch reactor, a trickling filter, a sand filter, or other fixed film device to reduce the level of contaminants including nitrogen in the wastewater before discharge.

After treatment, the effluent contains little or no remaining solids. Additionally, any sludge in the toilet and kitchen waste second compartment is removed. The third compartment of the toilet waste tank contains fully processed effluent.

This treated effluent is then transported to an evaporation system or an evapo-transpiration field or trenches in which the water is released to the environment as water vapor either through evaporation or through transpiration through plants that are a part of the evapo-transpiration field. Filtration systems may be employed in order to minimize the residual solid build-up in the evapo-transpiration system. Remaining nitrogen and phosphorous compounds in the water are used as fertilizer by the plants growing in the evapo-transpiration field. Salts may be precipitated and removed by periodic pumping. The remaining solids in the first compartment on the toilet waste tank are reduced by anaerobic and aerobic digestion or advanced oxidation or may be pumped periodically if needed.

A totally separate plumbing system is used to treat the non-toilet, non-kitchen liquid waste (or gray water). A single storage tank or any configuration of multiple storage tanks may be used to capture the gray water. This gray water is continuously treated with an advanced oxidation system exactly like that described above, or conventional advanced biological treatment processes. After treatment by the advanced oxidation or biological system, the water flows to a second tank where it is treated with an electrolytic cell and/or ultrasound that removes nitrogen compounds and phosphorus compounds via electrochemical transformation and/or ultrasonically induced cavitation. After electrolytic and/or ultrasonic treatment the water is filtered. The fully treated effluent is then available for reuse. The quality of the water is such that the water can be used for landscaping applications and as toilet flush water or any other legal non-potable reuse or recycling purpose. Indeed, any use not involving human consumption is appropriate at this point without further treatment. It is possible to discharge the treated (or untreated) effluent using a standard leach field or bed disposal system if desired.

Figure 1:
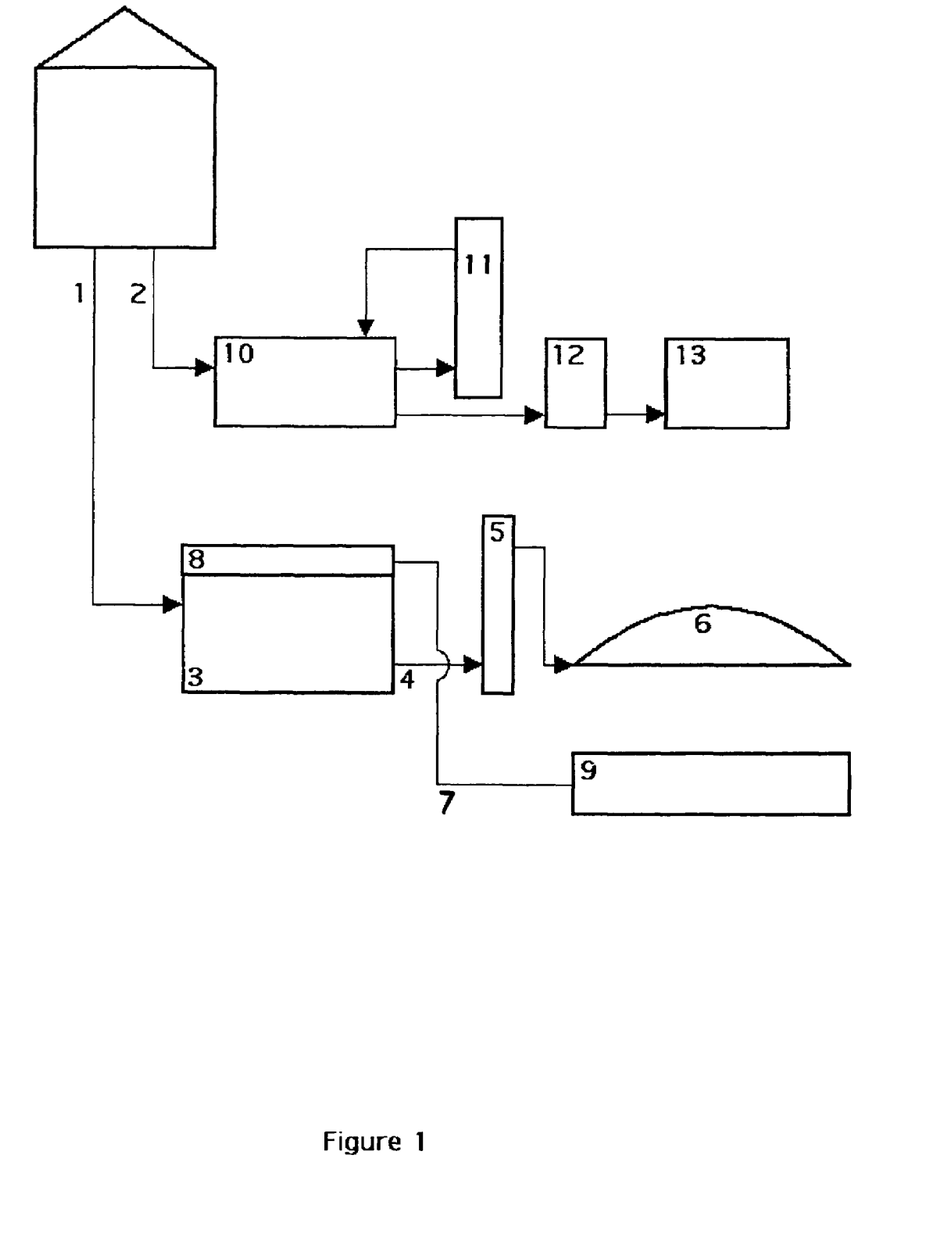
FIG. 1 is a flow diagram of a method of the invention.
Figure 2:
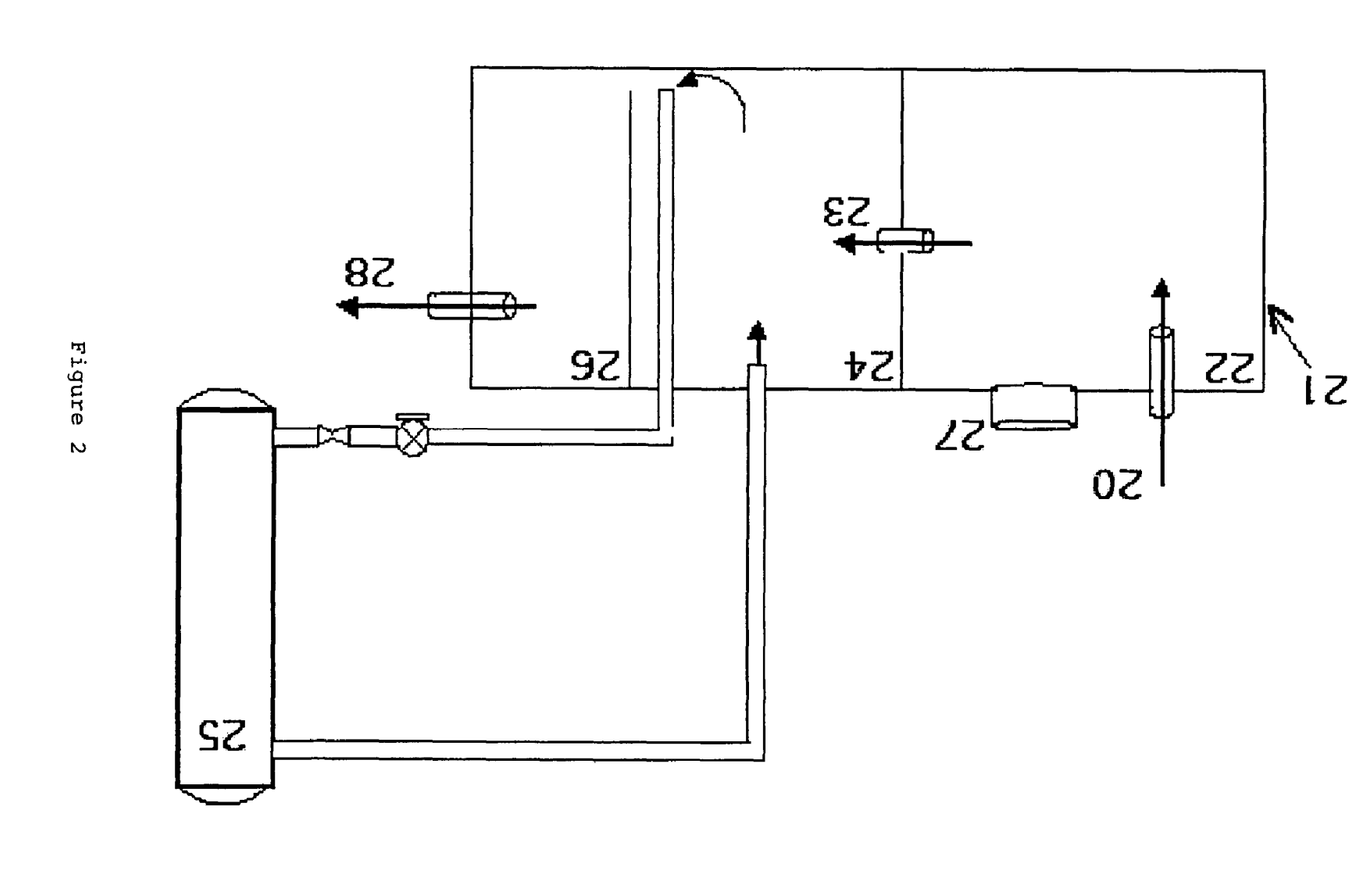
FIG. 2 is a schematic view of the toilet waste treatment unit component of an apparatus according to the invention.
Figure 3:
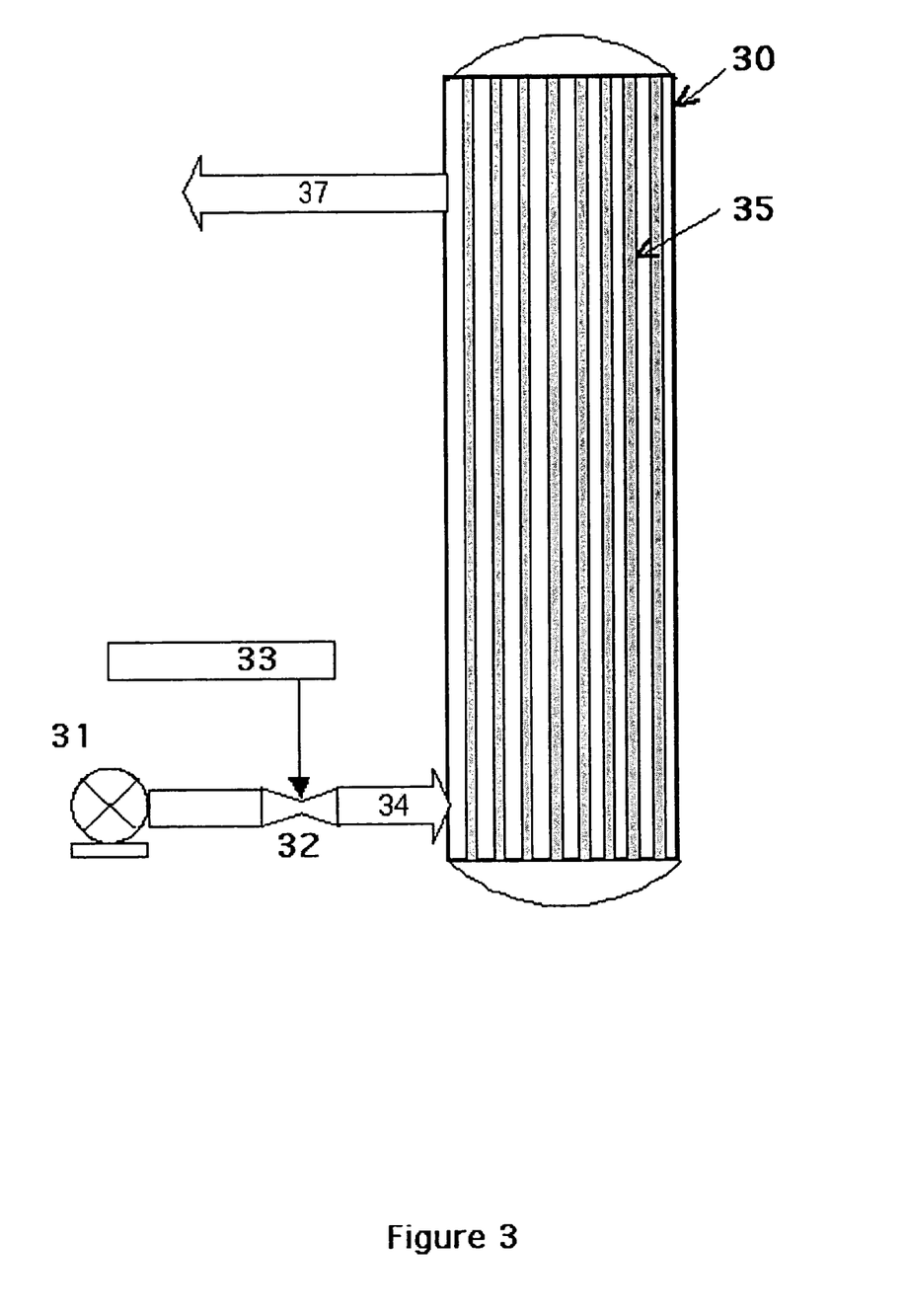
FIG. 3 is a more detailed schematic of the advanced oxidation system according to the invention, showing the key components including the ozone generation and injection, ultrasonic or other mixing, and the ultraviolet oxidation cell.
Figure 4:
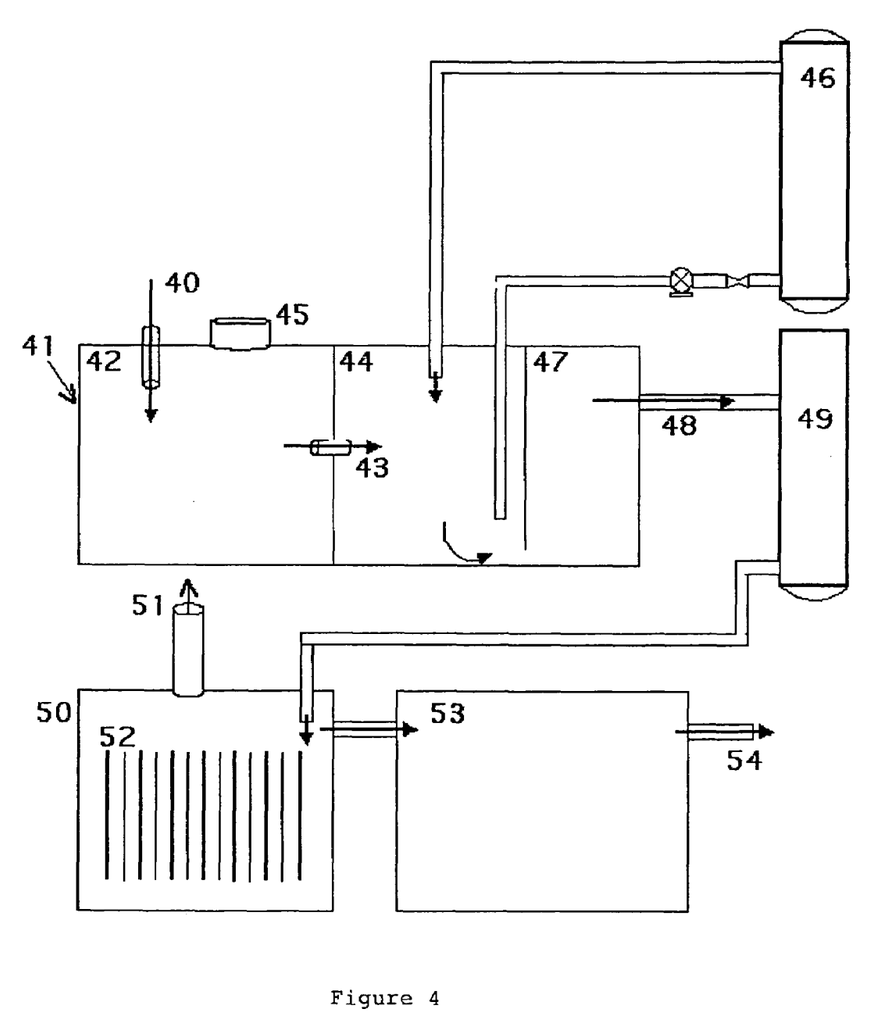
FIG. 4 is a schematic of the non-toilet waste treatment unit of an apparatus according to the invention, showing the key components including advanced oxidation, ultrasonic or other mixing, and electrolytic nitrogen and phosphorous reduction systems.

Reference is made to FIGS. 1-4. FIG. 1 is a flow diagram of a method according to the invention. The different waste streams and components found in the invention are described. The waste streams terminate in evaporation or evapo-transpiration of the liquid toilet waste stream and discharge of treated gray water in the non-toilet waste stream. FIG. 2 provides a schematic view of the toilet waste treatment unit component of an apparatus according to the invention. The different stages of treatment of toilet waste are shown in FIG. 2, and the toilet waste treatment unit uses a multi-compartment tank as part of the solid waste treatment and liquid separation. A more detailed schematic of the advanced oxidation system according to the invention is seen in FIG. 3, showing the key components including the ozone generation and injection, ultrasonic or other mixing, and the ultraviolet oxidation cell. FIG. 4 is a schematic of the non-toilet waste treatment unit of an apparatus according to the invention, showing the key components including advanced oxidation, ultrasonic or other mixing, and electrolytic nitrogen and phosphorous reduction systems.

FIG. 1 shows the general treatment process block diagram of the system. The toilet and kitchen waste 1 is segregated from the gray water 2. The toilet and kitchen waste 1 moves to a holding tank 3, where the initial stage of sedimentation and flotation occurs. Toilet and kitchen waste solids 7 are separated from the liquid toilet and kitchen waste 4. The liquid toilet and kitchen waste 4 is treated with an ultraviolet advanced oxidation system 5 to greatly reduce the total organic content (TOC) and the biological oxygen demand (BOD) of the liquid toilet and kitchen waste. The treated effluent then flows to an evaporation or evapo-transpiration unit 6 (generally according to known principles) in which the liquid is evaporated and/or transpired. Heat generated in the treatment process and added solar energy (if available) accelerates and enhances the evaporation process. The solid toilet and kitchen waste 7 can be removed by pumping 8 and transported for off site disposal, or to the destruction unit 9 where the solid waste 7 is dried, incinerated, or otherwise disposed.

The gray water 2 is stored in a standard septic tank 10. The gray water 3 is treated with an ultraviolet advanced oxidation system 11 to remove the total organic content and disinfect the water. Following treatment with the advanced oxidation system 11, the gray water can be treated to reduce the level of nitrogen and phosphorous in the water using electrolytic and ultrasonic reduction 12 of nitrogen and phosphorous compounds. The effluent is then stored in a holding tank 13 for reuse or disposal.

FIG. 2 details the sewage solids separation system. Here toilet and kitchen waste 20 is accumulated in a multi-compartment septic tank 21. The primary or septic tank 21 serves a number of purposes. The gross solids are coarsely separated from the liquid portion of the waste in the first compartment 22. Additionally, some anaerobic digestion is also taking place in the first compartment 22. The liquid toilet and kitchen waste 23 passes to the second compartment 24, from which waste is removed for ultrasound and advanced oxidation 25 treatment to remove remaining dissolved and suspended solids and organic carbon, after which the treated waste returns to the second compartment 24. It is not intended by this description to remove from the scope of the invention systems whereby ultrasound and/or advanced oxidation processes occur within the second compartment 24 itself. The third compartment 26 is where any remaining solids are separated from the effluent 24 by settling. Powerful oxidants generated by the advanced oxidation unit 25 can be portioned out into the first compartment 22 and the third compartment 26, as well as returned directly into the second compartment 24. The oxidants contained in the treated effluent that are returned into the first compartment 23 aid in long-term sludge reduction by aerobic digestion. Access to the first compartment 22 is provided by a man way 27 in the event that pumping of sludge and solids is required. The fully treated effluent from the third compartment 26 is released to the evapo-transpiration bed via the final outlet 28.

FIG. 3 shows a detail of the ultraviolet advanced oxidation system 30, which may be component 25 seen in FIG. 2. Here, the wastewater is injected into the treatment system with a pump 31 and then saturated with ozone using ozone generated with an ozone generator 33 (known in the art) and mixed into the liquid using a venturi or ultrasound 32. The liquid 34, saturated with ozone, is then passed through a bank of ultraviolet lamps 35 where the polychromatic ultraviolet radiation catalyzes the oxidation processes by converting the ozone into oxygen and hydroxyl radicals. The treated wastewater 37 then exits the treatment unit 30. This process can be repeated until the organic and elemental carbon in the wastewater is fully oxidized.

FIG. 4 shows a detail of the non-toilet waste treatment system. Here non-toilet waste 40 is accumulated in a multi-compartment septic tank 41. The primary or septic tank 41 serves a number of purposes. Any solids are coarsely separated from the liquid portion of the waste in the first compartment 42. Additionally, some anaerobic digestion is also taking place in the first compartment 42. The liquid non-toilet waste 43 passes to the second compartment 44, where ultrasound and/or advanced oxidation 46 is used to remove remaining dissolved and suspended solids and organic carbon. The third compartment 47 is where any remaining solids are separated from the effluent 24. Powerful oxidants generated by the advanced oxidation unit 46 can be portioned out into the first compartment 42 and the third compartment 47 as well as returned directly into the second compartment 44. The oxidants contained in the treated effluent that are returned into the first compartment 42 to aid in long-term sludge reduction by aerobic digestion. Access to the first compartment 42 is provided by a man way 45 in the event that pumping of sludge and solids is required.

The fully treated effluent from the third compartment 47 flows via the final outlet 48 to an optional filtering unit 49, typically a sand filter. The filtered and treated effluent then flows into the de-nitrification tank 50 in which electrolysis plates 52 are used to convert ammonia, nitrites, and nitrates into nitrogen gas (or other nitrogen containing gases, according to technology available in the art. These gases are vented from the system through a vent stack 51. The de-nitrified effluent flows into a storage tank 53. The effluent reaches the exit 54 of the treatment system where it is available for reuse or disposal.

In the following claims, "black water" refers to waste stream comparatively high in nitrogen and/or phosphorus, such as dishwasher and/or toilet waste water. "Gray water" means waste stream comparatively low in nitrogen or phosphorus, typically including water from sinks and showers.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

We claim:

1. A method for reducing contaminants in a wastewater stream, comprising segregating black wastewater from gray wastewater with separate plumbing and treatment systems further comprising the steps of:
   storing the black wastewater and separating solids therefrom; and evaporating the liquid portion of the black wastewater.

2. A method for reducing contaminants in a wastewater stream, comprising segregating black wastewater from gray wastewater with separate plumbing and treatment systems further comprising the steps of:
   storing the black wastewater and separating solids therefrom; and evapo-transpirating the liquid portion of the black wastewater.

3. The method of claim 1 or claim 2 further comprising the step of treating the black wastewater with an advanced oxidation system to remove organic materials prior to evaporating or evapo-transpirating the liquid portion.

4. The method of claim 1 wherein reducing contaminants comprises selecting for reduction at least one nitrogen compound from the group consisting of ammonia, organic nitrogen, nitrites, and nitrates.

5. The method of claim 1 wherein reducing contaminants comprises reducing phosphorus compounds.

6. The method of claim 1 wherein reducing contaminants comprises reducing solids comprising fats, oils, and grease.

7. The method of claim 1 wherein reducing contaminants comprises reducing pathogens.

8. The method of claim 1 wherein reducing contaminants comprises selecting for reduction at least one hazardous waste from the group consisting of solvents, pesticides, herbicides, masking agents, disinfectants, and cleaning agents.

9. The method of claim 1 further comprising the step of treating the black wastewater by a method selected from the group consisting of a chemical precipitation, aerobic treatment, sequencing batch reaction, trickling filtration, and sand filtration.

10. The method of claim 9 further comprising the step of treating the gray wastewater with at least one method selected from the group consisting of a chemical precipitation, aerobic treatment, sequencing batch reaction, trickling filtration, and sand filtration.

11. The method of claim 1 further comprising destroying by combustion organic solid materials in the black wastewater.

12. The method of claim 1 further comprising an ultrasonically treating the black wastewater to destroy solids and nitrogen or phosphorus compounds.

13. The method of claim 1 further comprising treating the grey wastewater and black wastewater in a septic system prior to discharge.

14. The method of claim 1 further comprising the step of treating by electrolysis the gray wastewater and the black wastewater to reduce phosphorus.

15. The method of claim 1 further comprising the step of ultrasonically treating the gray wastewater and the black wastewater to reduce nitrogen.

16. The method of claim 1 further comprising the step of ultrasonically treating the gray wastewater and the black wastewater to reduce phosphorus.

17. The method of claim 1 further comprising the step of removing organic carbon from the gray wastewater by advanced oxidation.

18. The method of claim 1 further comprising the step of treating the gray wastewater with ultraviolet radiation to disinfect the gray wastewater.

19. A method for reducing contaminants in a wastewater stream, comprising segregating black wastewater from gray wastewater with separate plumbing and treatment systems further comprising the step of treating by electrolysis the gray wastewater and the black wastewater to reduce nitrogen.

20. A system for reducing the level of contaminants in a wastewater stream, comprising separate plumbing and treatment systems for segregating black wastewater from gray wastewater further comprising:
means for storing the black wastewater for solids separation; and non-discharging means for evaporating the liquid portion of the black wastewater.

21. A system for reducing the level of contaminants in a wastewater stream, comprising separate plumbing and treatment systems for segregating black wastewater from gray wastewater further comprising:
means for storing the black wastewater for solids separation; and non-discharging means for evapo-transpirating the liquid portion of the black wastewater.

22. The system of claim 20 or claim 21 further comprising an advanced oxidation system for treating the black wastewater to remove organic materials prior to evaporation or evapo-transpiration.

23. The system of claim 20 wherein the contaminants comprise at least one nitrogen compound selected from the group consisting of ammonia, organic nitrogen, nitrites, and nitrates.

24. The system of claim 20 wherein the contaminants comprise phosphorus compounds.

25. The system of claim 20 wherein the contaminants are solids including fats, oils, and grease.

26. The system of claim 20 wherein the contaminants comprise pathogens.

27. The system of claim 20 wherein the contaminants comprise at least one hazardous wastes selected from the group consisting of solvents, pesticides, herbicides, masking agents, disinfectants, and cleaning agents.

28. The system of claim 20 further comprising advanced means for treating the black wastewater, comprising at least one member selected from the group consisting of a chemical precipitation unit, an aerobic system, a sequencing batch reactor, a trickling filter, and a sand filter.

29. The system of claim 28 further comprising advanced means for treating the gray wastewater, comprising at least one member selected from the group consisting of a chemical precipitation unit, an aerobic system, a sequencing batch reactor, a trickling filter, and a sand filter.

30. The system of claim 20 further comprising a combustion means for destroying organic solid materials in the black wastewater.

31. The system of claim 20 further comprising an ultrasonic system for treating the black wastewater to destroy solids and nitrogen or phosphorous compounds.

32. The system of claim 20 further comprising a septic system in which the grey wastewater and black wastewater is treated prior to discharge.

33. The system of claim 20 further comprising means for treating by electrolysis the gray wastewater and the black wastewater to reduce the level of phosphorus.

34. The system of claim 20 further comprising means for treating by ultrasound the gray wastewater and the black wastewater to reduce the level of nitrogen.

35. The system of claim 20 further comprising means for treating by ultrasound the gray wastewater and the black wastewater to reduce the level of phosphorus.

36. The system of claim 20 further comprising advanced oxidation means for treating the gray wastewater to remove organic carbon.

37. The system of claim 20 further comprising means for treating the gray wastewater with ultraviolet radiation to disinfect the gray wastewater.

38. A system for reducing the level of contaminants in a wastewater stream, comprising separate plumbing and treatment systems for segregating black wastewater from gray wastewater further comprising means for treating by electrolysis the gray wastewater and the black wastewater to reduce the level of nitrogen.

* * * * *